US010482363B1

(12) United States Patent
Cloutier et al.

(10) Patent No.: US 10,482,363 B1
(45) Date of Patent: *Nov. 19, 2019

(54) SYSTEMS AND METHODS FOR DETECTION MECHANISMS FOR MAGNETIC CARDS AND DEVICES

(71) Applicant: Dynamics Inc., Cheswick, PA (US)

(72) Inventors: Bruce S. Cloutier, Jeannette, PA (US); Jeffrey D. Mullen, Pittsburgh, PA (US)

(73) Assignee: DYNAMICS INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/195,128

(22) Filed: Mar. 3, 2014

Related U.S. Application Data

(63) Continuation of application No. 13/932,902, filed on Jul. 1, 2013, now Pat. No. 8,746,579, which is a continuation of application No. 13/038,570, filed on Mar. 2, 2011, now Pat. No. 8,348,172, which is a continuation of application No. 13/626,792, filed on Sep. 5, 2012, now Pat. No. 8,573,503.

(60) Provisional application No. 61/309,806, filed on Mar. 2, 2010.

(51) Int. Cl.
G06K 19/06 (2006.01)
(52) U.S. Cl.
CPC .............. G06K 19/06206 (2013.01)
(58) Field of Classification Search
CPC ............ G06K 19/06; G06K 7/00; G06K 7/08; G06K 5/00
USPC ........ 235/492, 449, 380, 451, 493, 487, 486
See application file for complete search history.

(56) References Cited

U.S. PATENT DOCUMENTS

| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,253,345 A | 10/1993 | Fernandes et al. |
| 5,276,311 A | 1/1994 | Hennige |
| 5,347,580 A | 9/1994 | Molva et al. |
| 5,361,062 A | 11/1994 | Weiss et al. |

(Continued)

FOREIGN PATENT DOCUMENTS

| JP | 05210770 | 8/1993 |
| JP | 05210770 A | 8/1993 |

(Continued)

OTHER PUBLICATIONS

U.S. Appl. No. 60/594,300, Poidomani et al.

(Continued)

*Primary Examiner* — Edwyn Labaze

(57) ABSTRACT

A card exhibiting enhanced detection is provided. A plurality of detector shapes that may be associated with a detection system increases detection effectiveness, while reducing adverse effects of detection systems that may be operating within a electromagnetic field environment.

33 Claims, 11 Drawing Sheets

(56) References Cited

U.S. PATENT DOCUMENTS

| | | |
|---|---|---|
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,955,961 A | 9/1999 | Wallerstein |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,195,414 B1 | 2/2001 | Simmons et al. |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,915,955 B2 | 7/2005 | Jung et al. |
| 6,929,550 B2 | 8/2005 | Hisada |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,557,705 B2 | 7/2009 | Oas |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,946,501 B2 | 5/2011 | Borracci |
| 7,954,705 B2 | 6/2011 | Mullen |
| 8,011,577 B2 | 9/2011 | Mullen et al. |
| 8,020,775 B2 | 9/2011 | Mullen et al. |
| 8,066,191 B1 | 11/2011 | Cloutier et al. |
| 8,074,877 B2 | 12/2011 | Mullen et al. |
| 8,172,148 B1 | 5/2012 | Cloutier et al. |
| 8,282,007 B1 | 10/2012 | Cloutier et al. |
| 8,286,876 B2 | 10/2012 | Mullen et al. |
| 8,302,872 B2 | 11/2012 | Mullen |
| 8,322,623 B1 | 12/2012 | Mullen et al. |
| 8,348,172 B1 | 1/2013 | Cloutier et al. |
| 8,382,000 B2 | 2/2013 | Mullen et al. |
| 8,393,545 B1 | 3/2013 | Mullen et al. |
| 8,393,546 B1 | 3/2013 | Yen et al. |
| 8,413,892 B2 | 4/2013 | Mullen et al. |
| 8,424,773 B2 | 4/2013 | Mullen et al. |
| 8,459,548 B2 | 6/2013 | Mullen et al. |

(56) References Cited

U.S. PATENT DOCUMENTS

| | | |
|---|---|---|
| 8,485,437 B2 | 7/2013 | Mullen et al. |
| 8,485,446 B1 | 7/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |
| 8,561,894 B1 | 10/2013 | Mullen et al. |
| 8,567,679 B1 | 10/2013 | Mullen et al. |
| 8,573,503 B1 | 11/2013 | Cloutier et al. |
| 8,579,203 B1 | 11/2013 | Lambeth et al. |
| 8,590,796 B1 | 11/2013 | Cloutier et al. |
| 8,602,312 B2 | 12/2013 | Cloutier et al. |
| 8,608,083 B2 | 12/2013 | Mullen et al. |
| 8,622,309 B1 | 1/2014 | Mullen et al. |
| 8,628,022 B1 | 1/2014 | Rhoades et al. |
| 8,668,143 B2 | 3/2014 | Mullen et al. |
| 8,727,219 B1 | 5/2014 | Mullen |
| 8,733,638 B2 | 5/2014 | Mullen et al. |
| 8,746,579 B1 | 6/2014 | Cloutier et al. |
| 8,757,483 B1 | 6/2014 | Mullen et al. |
| 8,757,499 B2 | 6/2014 | Cloutier et al. |
| 8,814,050 B1 | 8/2014 | Mullen et al. |
| 8,827,153 B1 | 9/2014 | Rhoades et al. |
| 8,875,999 B2 | 11/2014 | Mullen et al. |
| 8,881,989 B2 | 11/2014 | Mullen et al. |
| 8,888,009 B1 | 11/2014 | Mullen |
| 8,931,703 B1 | 1/2015 | Mullen et al. |
| 8,944,333 B1 | 2/2015 | Mullen et al. |
| 8,960,545 B1 | 2/2015 | Batra |
| 8,973,824 B2 | 3/2015 | Mullen et al. |
| 9,004,368 B2 | 4/2015 | Mullen et al. |
| 9,010,630 B2 | 4/2015 | Mullen et al. |
| 9,010,644 B1 | 4/2015 | Workley |
| 9,010,647 B2 | 4/2015 | Workley et al. |
| 9,033,218 B1 | 5/2015 | Batra |
| 9,053,398 B1 | 6/2015 | Cloutier |
| 9,064,194 B1 | 6/2015 | Bohac, Jr. |
| 9,064,195 B2 | 6/2015 | Hartwick et al. |
| 9,064,225 B2 | 6/2015 | Mullen et al. |
| 9,064,255 B1 | 6/2015 | Mullen et al. |
| 9,135,545 B1* | 9/2015 | Lamba ............ G06K 19/06206 |
| 9,292,843 B1 | 3/2016 | Mullen et al. |
| 9,306,666 B1 | 4/2016 | Zhang et al. |
| 9,329,619 B1 | 5/2016 | Cloutier |
| 9,349,089 B1 | 5/2016 | Rhoades et al. |
| 9,361,569 B2 | 6/2016 | Mullen et al. |
| 9,373,069 B2 | 6/2016 | Cloutier et al. |
| 9,384,438 B2 | 7/2016 | Mullen et al. |
| 9,547,816 B2 | 1/2017 | Mullen et al. |
| 9,619,741 B1 | 4/2017 | Rigatti |
| 9,639,796 B2 | 5/2017 | Mullen et al. |
| 9,646,240 B1 | 5/2017 | Mullen et al. |
| 9,646,750 B1 | 5/2017 | Workley |
| 9,652,436 B1 | 5/2017 | Yen et al. |
| 9,659,246 B1 | 5/2017 | Workley |
| 9,684,861 B2 | 6/2017 | Mullen et al. |
| 9,697,454 B2 | 7/2017 | Mullen et al. |
| 9,704,088 B2 | 7/2017 | Mullen et al. |
| 9,704,089 B2 | 7/2017 | Mullen et al. |
| 9,727,813 B2 | 8/2017 | Mullen et al. |
| 9,805,297 B2 | 10/2017 | Mullen et al. |
| 9,928,456 B1 | 3/2018 | Cloutier et al. |
| 10,032,100 B2 | 7/2018 | Mullen et al. |
| 10,095,974 B1 | 10/2018 | Mullen et al. |
| 10,169,692 B2 | 1/2019 | Mullen et al. |
| 10,176,419 B1 | 1/2019 | Cloutier et al. |
| 10,198,687 B2 | 2/2019 | Mullen et al. |
| 10,223,631 B2 | 3/2019 | Mullen et al. |
| 10,255,545 B2 | 4/2019 | Mullen et al. |
| 10,325,199 B2 | 6/2019 | Mullen et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0089774 A1 | 5/2003 | Schmieder et al. |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0054574 A1 | 3/2004 | Kaufman et al. |
| 2004/0058477 A1* | 3/2004 | Li ........................... H01L 24/83 438/119 |
| 2004/0133787 A1 | 7/2004 | Doughty |
| 2004/0162732 A1 | 8/2004 | Rahim et al. |
| 2004/0172535 A1 | 9/2004 | Jakobsson et al. |
| 2004/0177045 A1 | 9/2004 | Brown |
| 2004/0217169 A1 | 11/2004 | von Mueller et al. |
| 2005/0001711 A1 | 1/2005 | Doughty et al. |
| 2005/0011675 A1 | 1/2005 | Barr et al. |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0197540 A1 | 9/2005 | Liedtke |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0043180 A1 | 3/2006 | Ison et al. |
| 2006/0085328 A1 | 4/2006 | Cohen et al. |
| 2006/0091223 A1 | 5/2006 | Zellner |
| 2006/0124756 A1 | 6/2006 | Brown |
| 2006/0161435 A1 | 7/2006 | Atef et al. |
| 2006/0161789 A1 | 7/2006 | Doughty et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1* | 2/2007 | Poidomani ......... G06K 19/0702 235/492 |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0192249 A1 | 12/2007 | Biffle et al. |
| 2007/0290049 A1 | 12/2007 | Ratcliffe |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0029607 A1 | 2/2008 | Mullen |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0054068 A1 | 3/2008 | Mullen |
| 2008/0054079 A1 | 3/2008 | Mullen |
| 2008/0054081 A1 | 3/2008 | Mullen |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0096326 A1 | 4/2008 | Reed |
| 2008/0126398 A1 | 5/2008 | Cimino |
| 2008/0128515 A1 | 6/2008 | Di Iorio |
| 2008/0140536 A1 | 6/2008 | Ruiz et al. |

(56) References Cited

U.S. PATENT DOCUMENTS

| | | |
|---|---|---|
| 2008/0148394 A1 | 6/2008 | Poidomani et al. |
| 2008/0184795 A1* | 8/2008 | Woodard ............ G01R 33/1223 |
| | | 73/304 C |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2008/0314983 A1* | 12/2008 | Capurso ............ G06K 19/06187 |
| | | 235/441 |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0048971 A1 | 2/2009 | Hathaway et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen |
| 2009/0159689 A1 | 6/2009 | Mullen |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen |
| 2009/0159707 A1 | 6/2009 | Mullen |
| 2009/0159708 A1 | 6/2009 | Mullen |
| 2009/0159709 A1 | 6/2009 | Mullen |
| 2009/0159710 A1 | 6/2009 | Mullen et al. |
| 2009/0159711 A1 | 6/2009 | Mullen |
| 2009/0159712 A1 | 6/2009 | Mullen et al. |
| 2009/0159713 A1 | 6/2009 | Mullen |
| 2009/0160617 A1 | 6/2009 | Mullen et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0308921 A1 | 12/2009 | Mullen |
| 2009/0309733 A1 | 12/2009 | Moran |
| 2010/0016070 A1 | 1/2010 | Walker et al. |
| 2010/0029380 A1 | 2/2010 | Rhoads et al. |
| 2010/0093421 A1 | 4/2010 | Nyman et al. |
| 2010/0265037 A1 | 10/2010 | Domsten et al. |
| 2011/0028184 A1 | 2/2011 | Cooper |
| 2011/0108626 A1* | 5/2011 | Hepner et al. ................. 235/449 |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2011/0312286 A1 | 12/2011 | Lin |
| 2012/0028702 A1 | 2/2012 | Mullen et al. |
| 2012/0197708 A1 | 8/2012 | Mullen et al. |
| 2012/0209744 A1 | 8/2012 | Mullen et al. |
| 2012/0254037 A1 | 10/2012 | Mullen |
| 2012/0254038 A1 | 10/2012 | Mullen |
| 2012/0286037 A1 | 11/2012 | Mullen et al. |
| 2012/0286928 A1 | 11/2012 | Mullen et al. |
| 2012/0286936 A1 | 11/2012 | Mullen et al. |
| 2012/0290449 A1 | 11/2012 | Mullen et al. |
| 2012/0290472 A1 | 11/2012 | Mullen et al. |
| 2012/0318871 A1 | 12/2012 | Mullen et al. |
| 2013/0020396 A1 | 1/2013 | Mullen et al. |
| 2013/0217152 A1 | 8/2013 | Mullen et al. |
| 2013/0282573 A1 | 10/2013 | Mullen et al. |
| 2013/0282575 A1 | 10/2013 | Mullen et al. |
| 2014/0054384 A1 | 2/2014 | Cloutier et al. |
| 2014/0138449 A1* | 5/2014 | Goldman ......... G06K 19/06206 |
| | | 235/492 |
| 2014/0175170 A1 | 6/2014 | Bowers |
| 2014/0203902 A1 | 7/2014 | Shippee et al. |
| 2014/0233166 A1 | 8/2014 | O'Shea et al. |
| 2015/0186766 A1 | 7/2015 | Mullen et al. |
| 2015/0193679 A1 | 7/2015 | Workley et al. |
| 2015/0254546 A1 | 9/2015 | Hartwick et al. |
| 2016/0162713 A1 | 6/2016 | Cloutier et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0335531 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0011386 A1 | 1/2017 | Mullen et al. |
| 2017/0011388 A1 | 1/2017 | Mullen et al. |
| 2017/0300796 A1 | 10/2017 | Mullen et al. |

FOREIGN PATENT DOCUMENTS

| | | |
|---|---|---|
| WO | WO9852735 | 11/1998 |
| WO | WO0247019 | 6/2002 |
| WO | WO06066322 | 6/2006 |
| WO | WO2006066322 | 6/2006 |
| WO | WO06080929 | 8/2006 |
| WO | WO2006080929 | 8/2006 |
| WO | WO06105092 | 10/2006 |
| WO | WO2006105092 | 10/2006 |
| WO | WO06116772 | 11/2006 |
| WO | WO2006116772 | 11/2006 |
| WO | WO08064403 | 6/2008 |
| WO | WO2008064403 | 6/2008 |
| WO | PCT/US11/25047 | 2/2011 |
| WO | PCT/US11/37041 | 5/2011 |
| WO | PCT/US11/45991 | 7/2011 |
| WO | PCT/US12/31919 | 4/2012 |

(56) References Cited

FOREIGN PATENT DOCUMENTS

| WO | PCT/US12/31921 | 4/2012 |
| WO | PCT/US12/37237 | 5/2012 |
| WO | PCT/US13/26746 | 2/2013 |

OTHER PUBLICATIONS

U.S. Appl. No. 60/675,388, Poidomani et al.
U.S. Appl. No. 60/594,300, dated Mar. 26, 2005, Poidomani et al.
U.S. Appl. No. 60/675,388, dated Apr. 27, 2005, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

\* cited by examiner

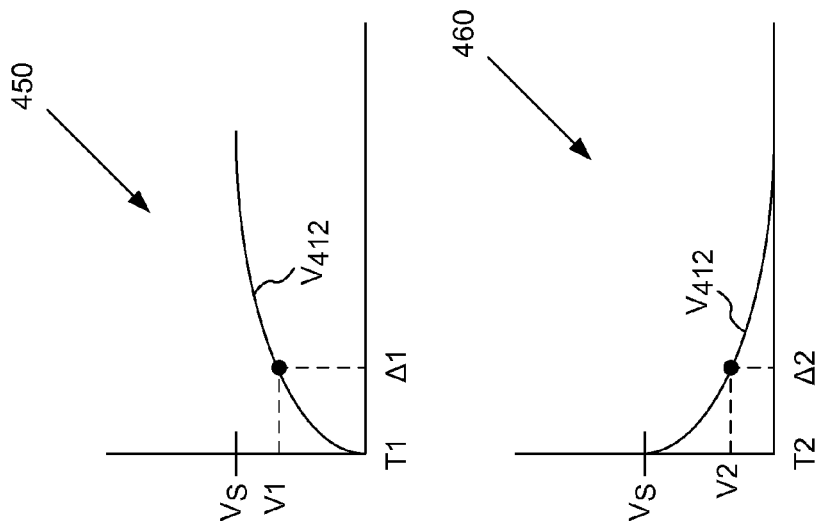
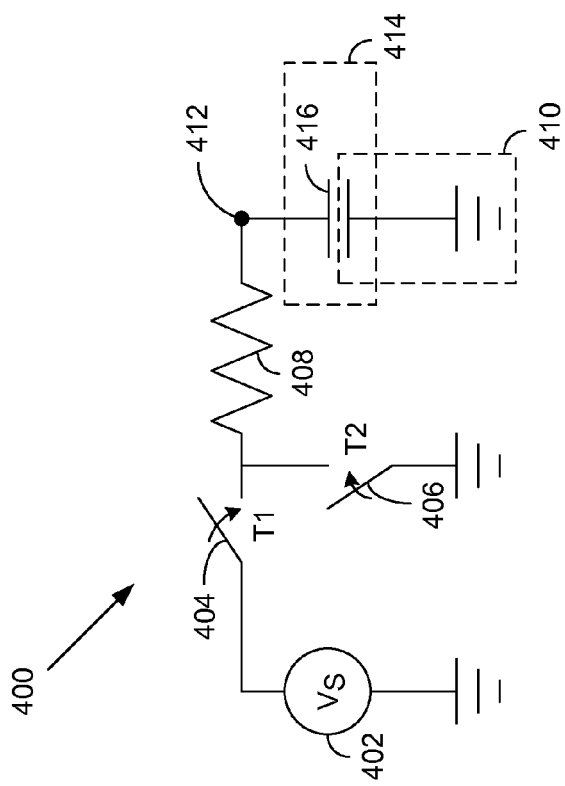
FIG. 4

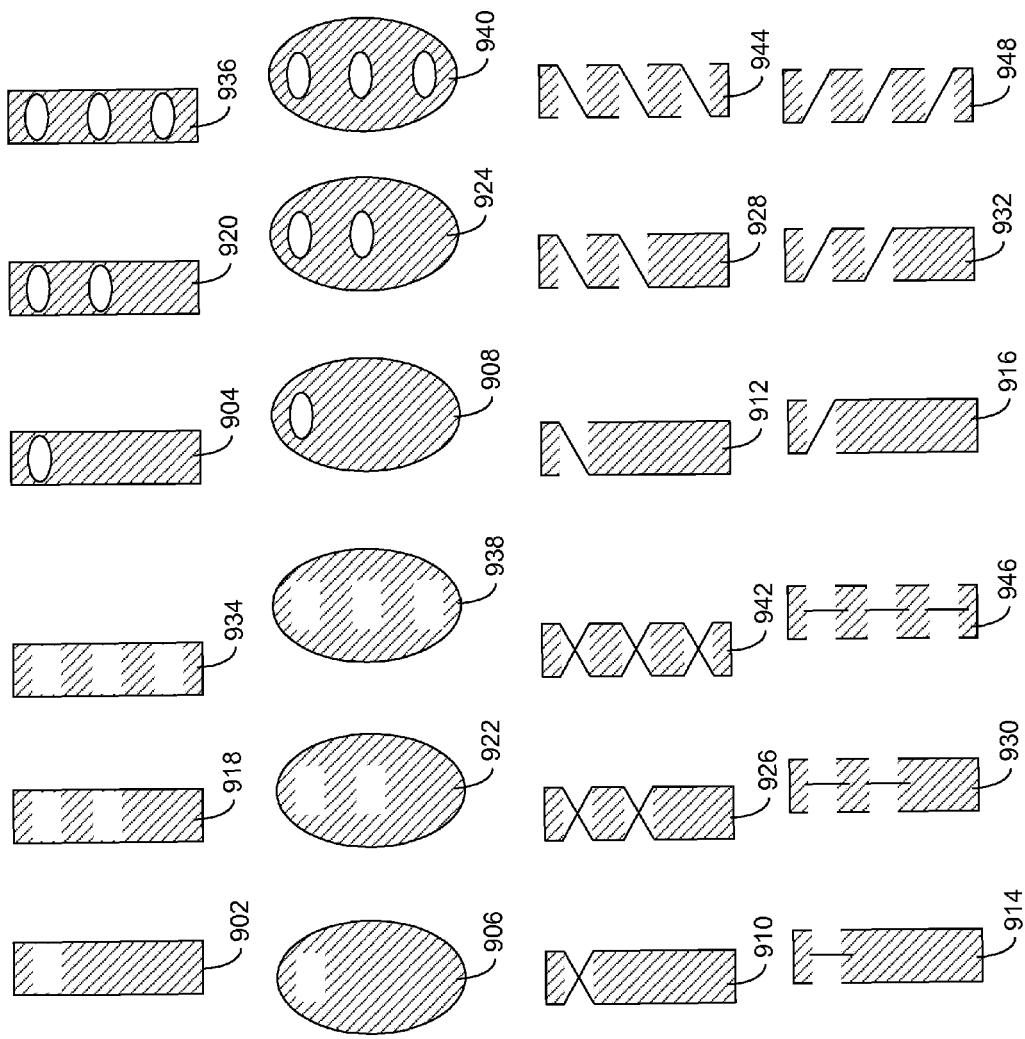

SYSTEMS AND METHODS FOR DETECTION MECHANISMS FOR MAGNETIC CARDS AND DEVICES

CROSS-REFERENCE TO RELATED APPLICATION

This application is a continuation of U.S. patent application Ser. No. 13/932,902, filed on Jul. 1, 2013, which is a continuation of U.S. patent application Ser. No. 13/626,792, filed on Sep. 25, 2012, which is a continuation of U.S. patent application Ser. No. 13/038,570, filed on Mar. 2, 2011, which claims the benefit of U.S. Provisional Patent Application No. 61/309,806, filed on Mar. 2, 2010, each of which is hereby incorporated by reference herein in its entirety.

BACKGROUND OF THE INVENTION

This invention relates to magnetic cards and devices and related systems.

SUMMARY OF THE INVENTION

A card may include a dynamic magnetic communications device, which may take the form of a magnetic encoder or a magnetic emulator. A magnetic encoder, for example, may be utilized to modify information that is located on a magnetic medium, such that a magnetic stripe reader may then be utilized to read the modified magnetic information from the magnetic medium. A magnetic emulator, for example, may be provided to generate electromagnetic fields that directly communicate data to a read head of a magnetic stripe reader. A magnetic emulator, for example, may communicate data serially to a read-head of the magnetic stripe reader. A magnetic emulator, for example, may communicate data in parallel to a read-head of the magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

A dynamic magnetic stripe communications device may be implemented on a multiple layer board (e.g., a two layer flexible printed circuit board). A coil for each track of information that is to be communicated by the dynamic magnetic stripe communications device may then be provided by including wire segments on each layer and interconnecting the wire segments through layer interconnections to create a coil. For example, a dynamic magnetic stripe communications device may include two coils such that two tracks of information may be communicated to two different read-heads included in a read-head housing of a magnetic stripe reader. A dynamic magnetic communications device may include, for example, three coils such that three tracks of information may be communicated to three different read-heads included in a read-head housing of a magnetic stripe reader.

One or more detectors may be provided, for example, to sense the presence of an external object, such as a person or device; which in turn, may trigger the initiation of a communication sequence with the external object. The sensed presence of the external object may then be communicated to a card, which in turn may direct the exchange of information between a card and the external object. Accordingly, timing aspects of the information exchange between a card and the various I/O devices implemented on a card may also be determined by a card.

The sensed presence of the external object or device may include the type of object or device that is detected and, therefore, may then determine the type of communication that is to be used with the detected object or device. For example, a detected object may include a determination that the object is a read-head of a magnetic stripe reader. Such an identifying detection, for example, may activate a dynamic magnetic stripe communications device (e.g., via a processor) so that information is communicated (e.g., electromagnetically) to the read-head of the magnetic stripe reader.

A read-head detector may be utilized in a variety of ways. For example, a read-head detector may cause a card to perform a particular function such as, for example, increase an internal counter indicative of the number of times the card has been swiped.

A detected object may include a determination that the card sends and/or receives information using, for example, visible light. Such an identifying detection, for example, may activate a communications device on the card that exchanges information using data that is modulated, for example, onto a visible data carrier.

One or more detectors may be utilized for passive and/or active detection. The detectors, for example, may detect proximity to an external object. Detectors may detect actual contact with an external object (e.g., a finger or pointing object).

Detectors may be shaped, for example, to reduce adverse effects that may be caused by exposing conductive materials to electromagnetic signals. The detectors may be shaped, for example, to increase effectiveness in performing proximity and/or actual contact detection.

One or more read-head detectors, for example, may be provided on one side of a card. The one or more read-head detectors may be provided as, for example, conductive pads that may be arranged along a length of the card having a variety of shapes. The shapes of the one or more conductive pads, for example, may be provided on the card to increase a conductive area of the conductive pad that is not positioned across from a dynamic magnetic stripe communications device. The shapes of the one or more conductive pads, for example, may be provided on the card to decrease a conductive area of the conductive pad that is positioned across from a dynamic magnetic stripe communications device. In doing so, for example, the amount of interference that a read-head detector imparts on a communicating dynamic magnetic stripe communications device may be reduced.

A processor may be used to implement an active search mode to detect, for example, a read-head housing of a magnetic stripe reader using, for example, read-head detectors. Accordingly, a dynamic magnetic stripe communications device may be activated in response to the detection. For example, one or more dynamic magnetic stripe communications devices may provide one or more tracks of magnetic stripe data in response to the detection.

A processor may enter and exit sleep modes during the active search mode to reduce power consumption. For example, the processor may enter and exit sleep modes at a particular frequency for a period of time. The period of time may end, for example, when the processor detects, for example, a read-head housing. Idle states may be used to further reduce power consumption, for example, by delaying the active search mode.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 4 is an illustration of circuitry, and associated waveforms, constructed in accordance with the principles of the present invention;

FIG. 9 is an illustration of detection circuitry constructed in accordance with the principles of the present invention;

DETAILED DESCRIPTION OF THE INVENTION

Figure 1:
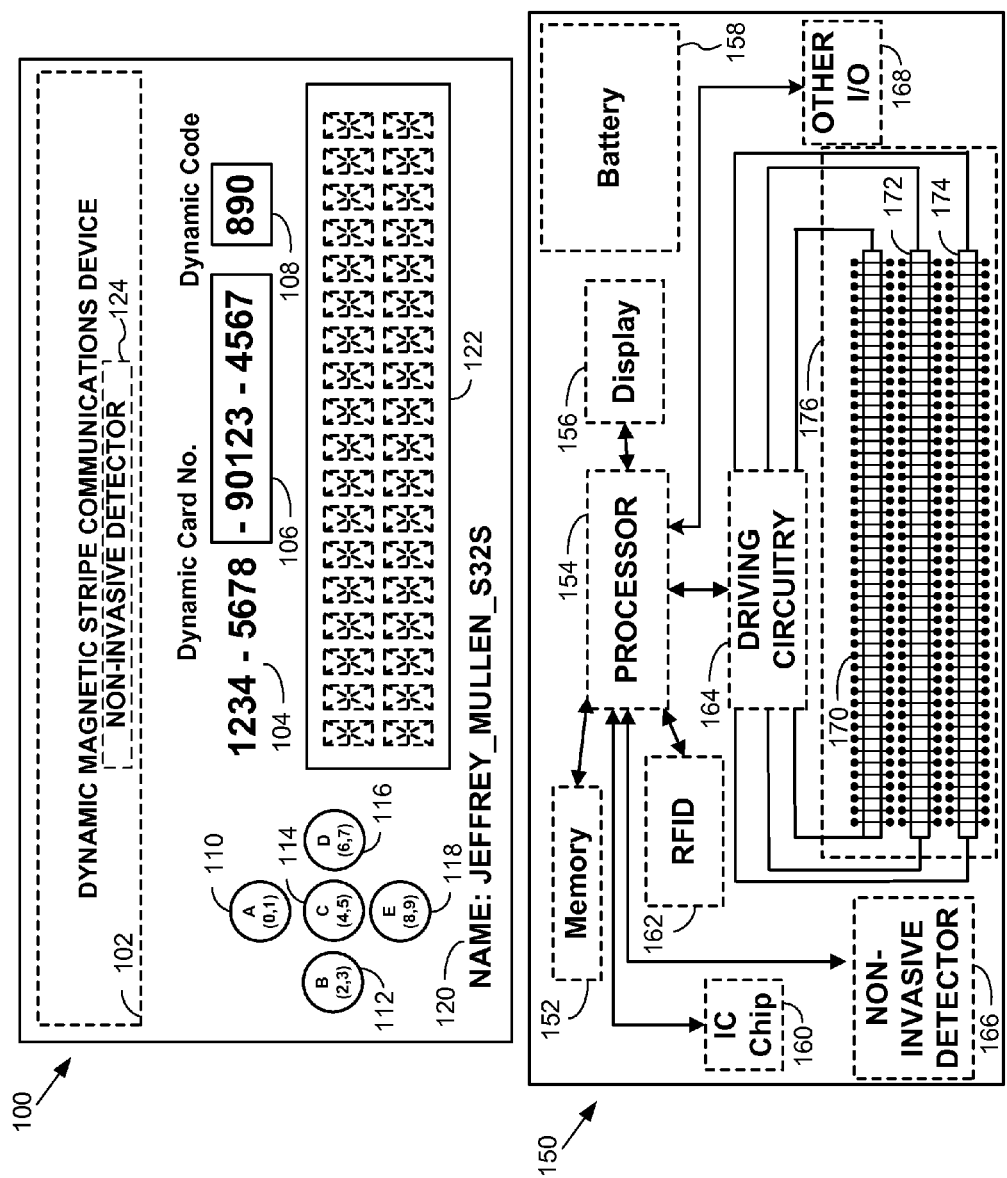
FIG. 1 is an illustration of a card constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may also be entirely, or partially, displayed via a second display, e.g., display 108. Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Persons skilled in the art will appreciate that card 100 may, for example, be a self-contained device that derives its own operational power from one or more batteries 158. Furthermore, one or more batteries 158 may be included, for example, to provide operational power to card 100 for a period of time (e.g., approximately 2-4 years). One or more batteries 158 may be included, for example, as rechargeable batteries.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by card 100 as data input.

Card 100 may be implemented using architecture 150, which may include one or more processors 154. One or more processors 154 may be configured to utilize external memory 152, memory internal to processor 154, or a combination of external memory 152 and internal memory for dynamically storing information, such as executable machine language, related dynamic machine data, and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may be, for example, touch sensitive and/or proximity sensitive. For example, objects such as fingers, pointing devices, etc., may be brought into contact with displays 156, or in proximity to displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented on card 100. For example, integrated circuit (IC) chip 160 (e.g., an EMV chip) may be included on card 100, that can communicate information with a chip reader (e.g., an EMV chip reader). Radio frequency identification (RFID) module 162 may be included within card 100 to enable the exchange of information between an RFID reader and card 100.

Other input and/or output devices 168 may be included on card 100, for example, to provide any number of input and/or output capabilities on card 100. For example, other input and/or output devices 168 may include an audio device capable of receiving and/or transmitting audible information, such as for example, dual-tone multi-frequency (DTMF) signaling that may facilitate I/O data exchange between card 100 and a telephony system. Other audible signaling may include, for example, modem signaling to facilitate I/O data exchange between card 100 and a device that utilizes modulation/demodulation (MODEM) techniques to modulate an analog carrier with analog and/or digital information.

Other input and/or output devices 168 may include a device that exchanges analog and/or digital data using a visible data carrier, such as light amplification by stimulated emission of radiation (LASER), light-emitting diode (LED), etc. Other input and/or output devices 168 may include a device, for example, that is sensitive to a non-visible data carrier, such as an infrared data carrier or electromagnetic data carrier. Any type of tactile, audible, visible, and/or non-visible means of information exchange may be provided on card 100.

Dynamic magnetic stripe communications device 102 may be included on card 100 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a soft-magnetic material and/or a non-magnetic material). Additional materials may be placed outside the coil (e.g., a hard magnetic material).

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between card 100 and the various I/O devices implemented on card 100 may be determined by card 100. One or more detectors 166, such as non-invasive detectors, may be utilized, for example, to sense the proximity, mechanical distortion, or actual contact, of an external device, which in turn, may trigger the initiation of a communication sequence. The sensed presence or touch of the external device may then be communicated to (e.g., processor 154), which in turn may direct the exchange of information between card 100 and the external device. The sensed presence, mechanical distortion, or touch of the external device may be effective to, for example, determine the type of device or object detected. Persons skilled in the art will appreciate that communications directed to the detected device or object may be compatible with the detected device or object.

For example, the detection may include the detection of, for example, a read head of a magnetic stripe reader. In response, processor 154 may activate one or more electromagnetic field generators 170-174 to initiate a communications sequence with, for example, one or more read-heads of a magnetic stripe reader. The timing relationships associated with communications to one or more electromagnetic field generators 170-174 and one or more read-heads of a magnetic stripe reader may be provided through use of the detection of the magnetic stripe reader.

Persons skilled in the art will appreciate that processor 154 may provide user-specific and/or card-specific information through utilization of any one or more of buttons 110-118, RFID 162, IC chip 160, electromagnetic field generators 170-174, and other input and/or output devices 168.

One or more non-invasive detectors 124 may be implemented to detect, for example, the proximity, or actual contact, of an object, such as a read-head of a magnetic stripe reader. Non-invasive detectors 124 may be utilized, for example, to sense contact with, or the presence of objects (e.g., a read head of a magnetic stripe reader) while minimizing interference with the electromagnetic signals that may be generated by dynamic magnetic stripe communications device 102.

Figure 2:
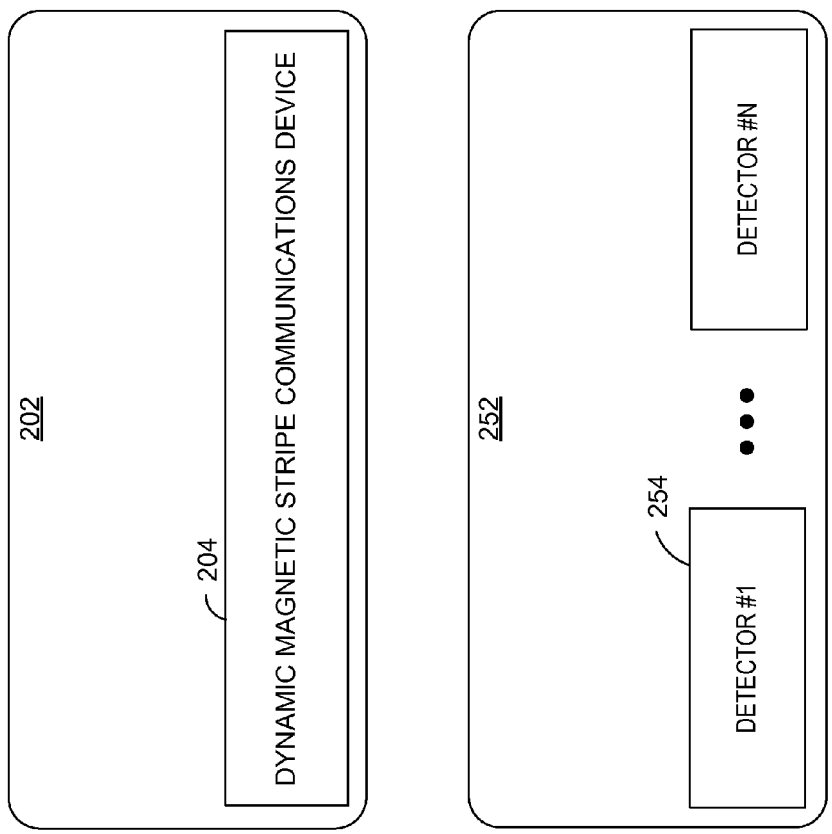
FIG. 2 is an illustration of a card constructed in accordance with the principles of the present invention.

FIG. 2 shows card 200. Card 200 may include front surface 202 having a dynamic magnetic stripe communications device 204 and a back surface 252 having one or more detectors 254.

A physical location of one or more detectors 254 on surface 252 and a physical location of dynamic magnetic stripe communications device 204 on surface 202 may be at any location on card 200. For example, physical locations of detectors 254 and dynamic magnetic stripe communications device 204 may be provided across from one another. Accordingly, for example, detectors 254 may interfere with the communicated signals as may be generated by dynamic magnetic stripe communications device 204 during communications with an external device. For example, the communicated signals may induce an electrical current (e.g., an eddy current) within detectors 254, which may then interfere with the communicated signals. Accordingly, attributes (e.g., shapes) of detectors 254 may reduce such interference.

Card 200 may be a laminated structure. Persons skilled in the art will appreciate that some or all components of a card may be embedded within card 200. For example, detectors 254 may be provided on surface 252 or may be embedded below one or more layers of lamination. Similarly, dynamic magnetic stripe communications device 204 may be embedded beneath one or more layers of lamination.

Figure 3:
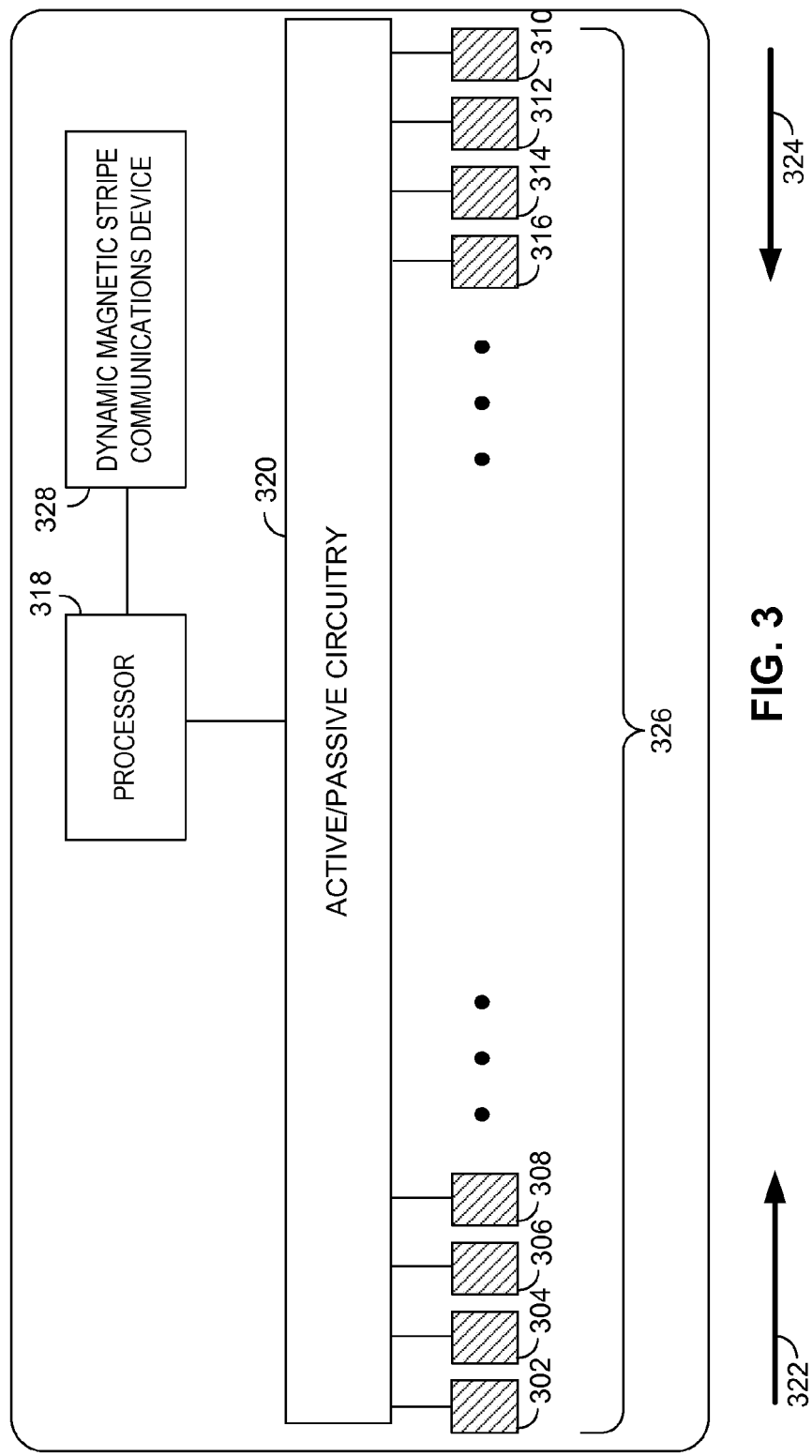
FIG. 3 is an illustration of a card constructed in accordance with the principles of the present invention.

FIG. 3 shows card 300. Card 300 may include, for example, an orientation of detectors (e.g., conductive pads 326), whereby one or more conductive pads 302-316 may be, for example, arranged along a length of card 300. Conductive pads 302-316 may be provided, for example, using an additive technique, whereby patterns of a conductive element (e.g., copper) may be applied to a PCB substrate according to a patterning mask definition layer. Conductive pads 302-316 may be provided, for example, using a subtractive technique whereby patterns of a conductive element (e.g., copper) may be removed from a pre-plated PCB substrate according to an etching mask definition layer. Other non-PCB fabrication techniques may be used to implement conductive pads 302-316 as may be required by a particular application.

Active/passive circuitry 320 may be utilized to incorporate conductive pads 302-316 and processor 318 into a detection system. Persons skilled in the art will appreciate that a pad may be utilized by a processor as a capacitive sensing pad. Persons skilled in the art will further appreciate that a processor may include the functionality to control and determine when an object is in the proximity of the pad via a capacitive sensing technique.

FIG. 4 shows an active detection system that may be included on a card. A conductive pad may be utilized, for example, as a conductor of a capacitive device within a resistor/capacitor (RC) circuit to determine the capacitance of a detector and determine whether it is below, equal to, or above one or more predetermined thresholds.

A conductive pad, for example, may form a portion of a capacitive element, such that plate 416 of capacitive element 414 may be implemented by a conductive pad and the second plate of capacitive element 414 is implemented by element 410. Element 410 may represent, for example, the device or object whose proximity or contact is sought to be detected.

The capacitance magnitude of capacitive element 414 may exhibit, for example, an inversely proportional relationship to the distance separation between plate 416 and device 410. For example, the capacitance magnitude of capacitive element 414 may be relatively low when the corresponding distance between plate 416 and device 410 may be relatively large. The capacitance magnitude of capacitive element 414 may be relatively large, for example, when the corresponding distance between plate 416 and device 410 is relatively small.

Detection, for example, may be accomplished actively via circuit 400 of FIG. 4. Through a sequence of charging and discharging events, an average capacitance magnitude for capacitive element 414 may be determined over time. Accordingly, for example, the spatial relationship between plate 416 and device 410 may be determined.

Charge sequence 450 may, for example, be invoked, such that switch 404 may be closed at time T1, while switch 406 may remain open. Accordingly, for example, current may flow from voltage supply 402 through switch 404 and resistive component 408. In doing so, for example, an electrostatic field may be generated that may be associated with capacitive component 414. During the charge sequence, for example, the voltage at node 412 may be monitored to determine the amount of time required (e.g., $T_{CHARGE}=\Delta 1-T1$) for the voltage at node 412, $V_{412}$, to obtain a magnitude that is substantially equal to, below, or above a first threshold voltage (e.g., equal to V1).

Discharge sequence 460 may, for example, be invoked, such that switch 406 may be closed at time T2, while switch 404 may remain open. During the discharge sequence, for example, the electric field associated with capacitive element 414 may be allowed to discharge through resistive component 408 to a reference potential (e.g., ground potential). The voltage at node 412 may be monitored to determine the amount of time required (e.g., $T_{DISCHARGE}=\Delta 2-T2$) for the voltage at node 412, $V_{412}$, to obtain a magnitude that is substantially equal to, below, or above a second threshold voltage (e.g., equal to V2).

Once the charge time, $T_{CHARGE}$, and discharge time, $T_{DISCHARGE}$, are determined, the charge and discharge times may be utilized to calculate a capacitance magnitude that may be exhibited by capacitive element 414. For example, given that the magnitude of voltage, V1, may be equal to approximately 67% of the magnitude of voltage, $V_S$, then a first relationship may be defined by equation (1) as:

$$T_{CHARGE}=R_{408}*C1, \quad (1)$$

where $R_{408}$ is the resistance magnitude of resistive element 408 and C1 is proportional to a capacitance magnitude of capacitive element 414.

Similarly, for example, given that the magnitude of voltage, V2, may be equal to approximately 33% of the magnitude of voltage, $V_S$, then a second relationship may be determined by equation (2) as:

$$T_{DISCHARGE}=R_{408}*C2, \quad (2)$$

where C2 is proportional to a capacitance magnitude of capacitive element 414. The capacitance magnitudes, $C_1$ and $C_2$, may then be calculated from equations (1) and (2) and averaged to determine an average capacitance magnitude that may be exhibited by capacitive element 414.

Persons skilled in the art will appreciate that switches 404 and 406 may be opened and closed by a processor. Accordingly, for example, a processor may control when the charge and discharge events occur. Persons skilled in the art will further appreciate that a processor may be placed into a sleep mode (e.g., a power-save mode) during times (e.g., $T_{CHARGE}$ and $T_{DISCHARGE}$). Accordingly, for example, the processor may conserve power. Interrupts may be used, for example, to wake the processor up from sleep mode when a signal (e.g. voltage $V_{412}$) is equal to, less than, or more than a predetermined threshold.

Persons skilled in the art will appreciate that a processor may include one or more low-power sleep modes. The processor may be placed into a sleep mode and may awaken from a sleep mode at any time. A processor may, for example, put itself into sleep mode and awaken itself from sleep mode either via an external signal or an internal timer. Accordingly, for example, a processor may be placed into sleep mode and awaken from sleep mode at a particular frequency in order to reduce power consumption.

More particularly, a card may be placed into a mode where the card is determining whether a read-head detector detects a read-head. During this mode, for example, a processor may periodically go into a sleep mode and awake from a sleep mode. The frequency that this occurs may be fast enough such that a processor may awake, determine whether or not a detector has sensed a read-head, and then go back to sleep faster than the amount of time it takes a read-head to pass by that detector during a swipe. In doing so, for example, the processor may detect a read-head at some point the read-head is in the vicinity of the detector, but may be otherwise in sleep mode. In doing so, power consumption may be reduced.

A processor may enter sleep mode, and awaken from sleep mode, numerous times. For example, a processor may enter sleep mode, and awaken from sleep mode at least 5 times per second (e.g., at least 20 times per second) while the processor is in a mode searching for a read-head (e.g., a mode that may span approximately 5-15 minutes).

Turning back to FIG. 3, a series of charge and discharge sequences for the remaining conductive pads 304-316, may be executed to determine a relative capacitance magnitude that is exhibited by each of the remaining conductive pads 304-316. A series of charge and discharge sequences for each of conductive pads 302-316 may then be executed in order to obtain a capacitance characteristic for each of conductive pads 302-320 over time.

By comparing the time-based capacitance characteristic of conductive pad 302-316 to a threshold capacitance value, a determination may be made, for example, as to when conductive pads 302-316 are in a proximity, or touch, relationship to a device whose presence is to be detected. For example, a sequential increase in the relative capacitance magnitudes of conductive pads 302-308 may be detected to determine, for example, that a device is moving substantially in direction 322 relative to card 300. A sequential increase in the relative capacitance magnitudes of conductive pads 310-316 may be detected, for example, to determine that a device is moving substantially in direction 324 relative to card 300.

Persons skilled in the art will appreciate that by electrically shorting pairs of conductive pads together (e.g., pair 302/310, pair 304/312, pair 306/314, etc.) directional vectors 322 and 324 become insubstantial. For example, regardless of whether a device is moving substantially in direction 322 or substantially in direction 324 relative to card 300, a determination may nevertheless be made that a device is close to, or touching, card 300.

A controller, such as processor 318, may be used in conjunction with, for example, active/passive circuitry 320 and one or more conductive pads 302-316, for example, to determine that a device (e.g., a read-head housing of a magnetic stripe reader) is in close proximity, or touching, one or more detectors. Once the location and/or type of a device is detected, processor 318 may prepare, for example, dynamic magnetic stripe communications device 328 for communication. For example, one or more electromagnetic field generators may be included within dynamic magnetic stripe communications device 328 to communicate one or more tracks of electromagnetic data to, for example, a read head of a magnetic stripe reader. The electromagnetic field generators of dynamic magnetic stripe communications device 328 may include, for example, a series of electromagnetic elements.

Electrical excitation of each electromagnetic element may generate, for example, an electromagnetic field having a variable polarity and/or magnitude. In so doing, for example, one or more electromagnetic field generators may be utilized to communicate electromagnetic information to, for example, a read-head of a magnetic stripe reader.

Dynamic magnetic stripe communications device 328 and conductive pads 326 may be positioned in proximity to one another (e.g., along opposing surfaces of card 300). Accordingly, for example, eddy currents may be induced within one or more conductive pads 302-316 in the presence of an electromagnetic field that may be generated by dynamic magnetic stripe communications device 328. Such eddy currents may then induce electromagnetic fields associated with one or more conductive pads 302-316 that oppose the transfer of electromagnetic information from dynamic magnetic stripe communications device 328 to, for example, a read-head of a magnetic stripe reader.

Figure 5:
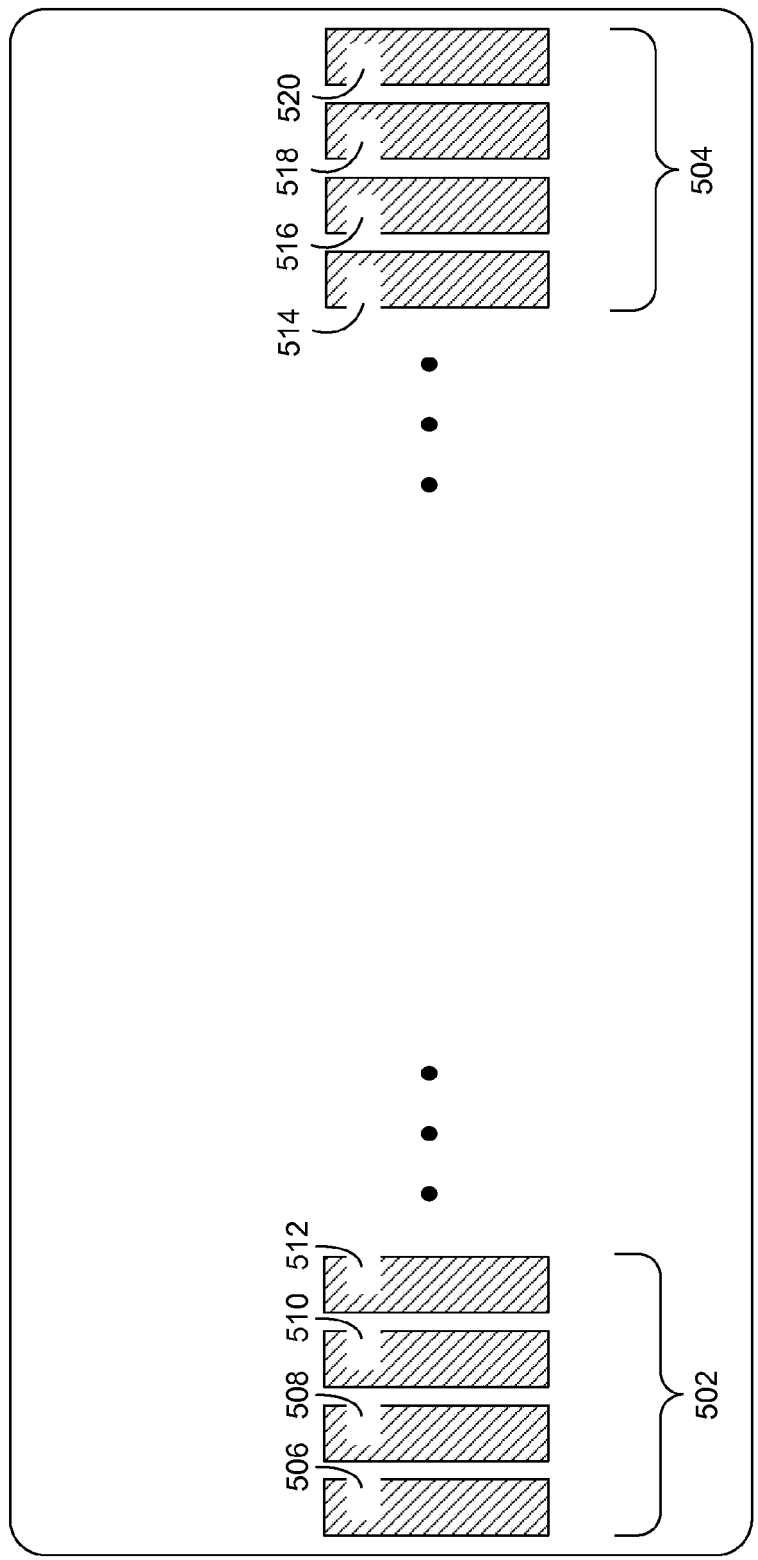
FIG. 5 is an illustration of a card constructed in accordance with the principles of the present invention.

FIG. 5 shows card 500 having conductive pads 502-504. Conductive pads 502-504 may be operative, for example, to reduce a magnitude of eddy current generated within one or more of conductive pads 502-504 when, for example, an electromagnetic field generator on card 500 is utilized to communicate electromagnetic information. Conductive pads 502-504 may be any size and/or any shape (e.g., substantially rectangular in shape with substantially sharp corners).

One or more portions 506-520 may, for example, be eliminated from conductive pads 502-504. The shape of portions 506-520 may, for example, be any size and/or any shape (e.g., substantially square or rectangular in shape with substantially sharp corners). Accordingly, for example, the area of conductive material contained within conductive pads 502-504 may be reduced. More particularly, for example, portions 506-520 may be positioned across from a physical location of an electromagnetic field generator on card 500, thereby reducing the area of conductive material within which eddy current may be formed. Persons skilled in the art will appreciate that a manufacturing process used to generate, for example, sharp corners may be more complex than a manufacturing process used to generate, for example, rounded corners.

Figure 6:
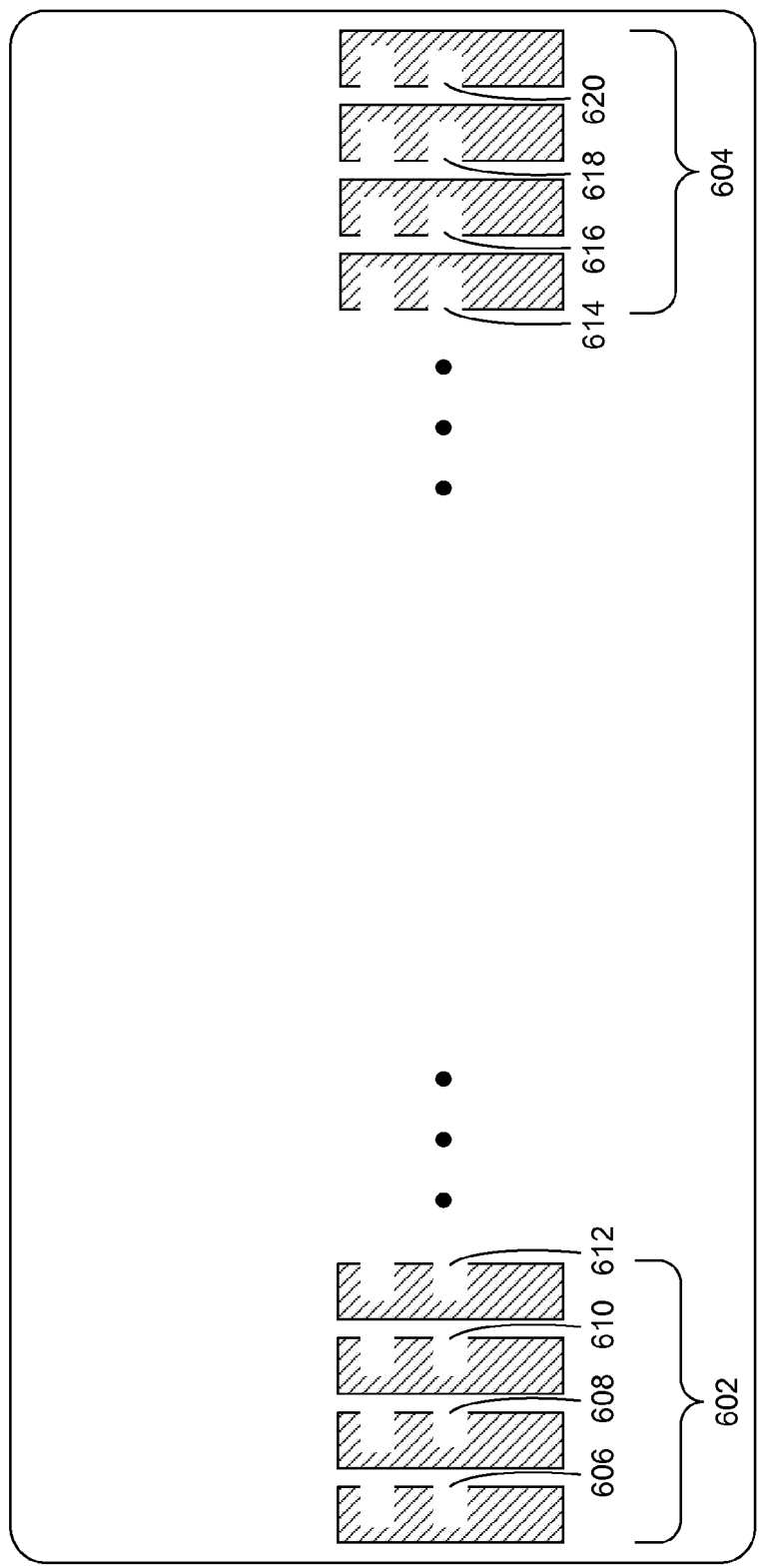
FIG. 6 is an illustration of a card constructed in accordance with the principles of the present invention.

FIG. 6 shows card 600 having conductive pads 602-604. Conductive pads 602-604 may be operative to reduce the magnitude of eddy current generated within one or more of conductive pads 602-604 when, for example, two electromagnetic field generators on card 600 are utilized to communicate electromagnetic information. Conductive pads 602-604 may be any size and/or any shape (e.g., substantially rectangular in shape with substantially sharp corners).

Portions 606-620 may be eliminated from conductive pads 602-604, so as to reduce the area of conductive material contained within conductive pads 602-604. The shape of portions 606-620 may, for example, be any size and/or any shape (e.g., substantially square or rectangular in shape with substantially sharp corners). More particularly, for example, portions 606-620 may be positioned across from a physical location of an electromagnetic field generator on card 600, thereby further reducing the area of conductive material within which eddy current may be formed.

Figure 7:
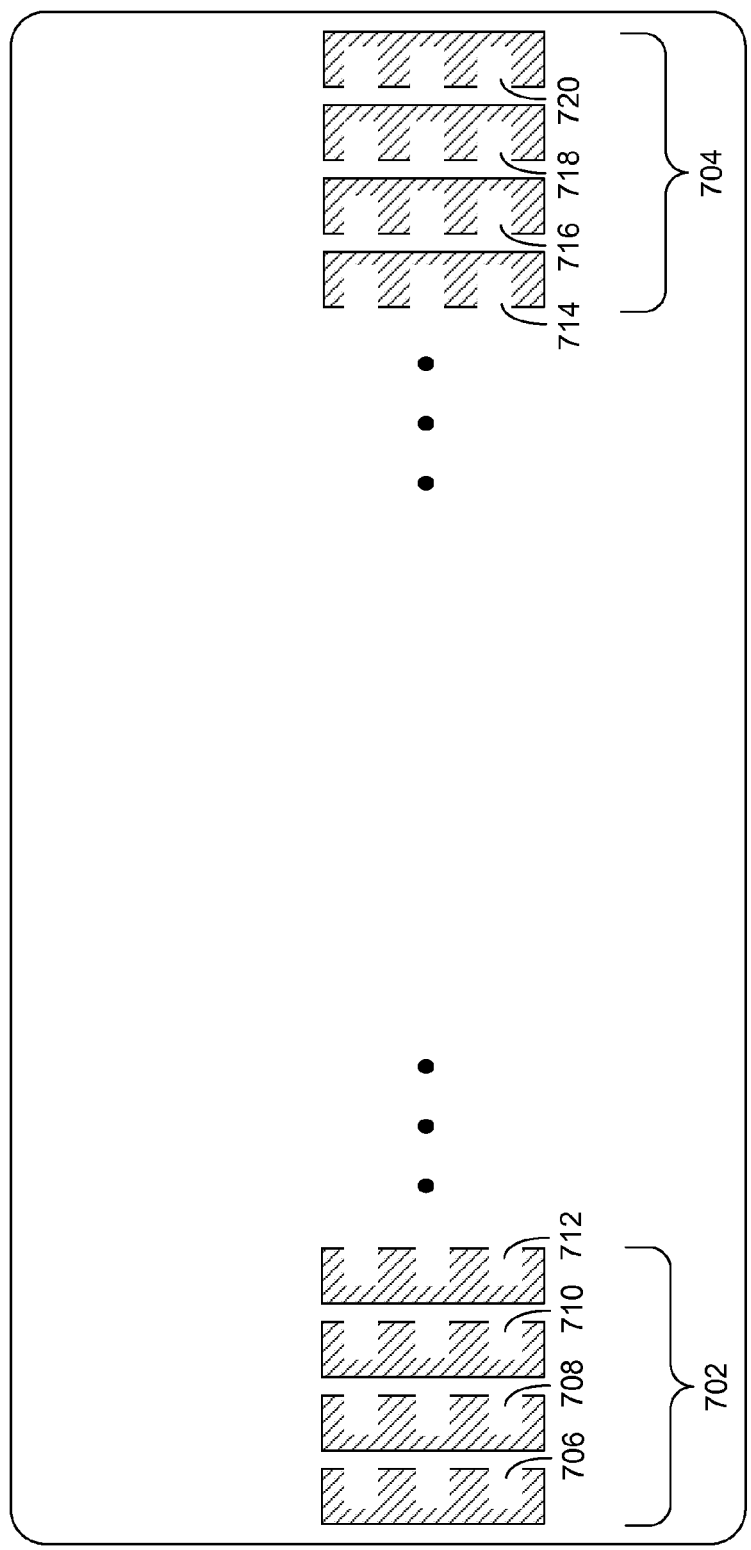
FIG. 7 is an illustration of a card constructed in accordance with the principles of the present invention.

FIG. 7 shows card 700 having conductive pads 702-704. Conductive pads 702-704 may be operative to reduce the magnitude of eddy current generated within one or more of conductive pads 702-704 when, for example, three electromagnetic field generators on card 700 are utilized to communicate electromagnetic information. Conductive pads 702-704 may be any size and/or any shape (e.g., substantially rectangular in shape with substantially sharp corners).

Portions 706-720 may be eliminated from conductive pads 702-704, so as to further reduce the area of conductive material contained within conductive pads 702-704. The shape of portions 706-720 may, for example, be any size and/or any shape (e.g., substantially square or rectangular in shape with substantially sharp corners). More particularly, for example, portions 706-720 may be positioned across from a physical location of an electromagnetic field generator on card 700, thereby further reducing the area of conductive material within which eddy current may be formed.

Figure 8:
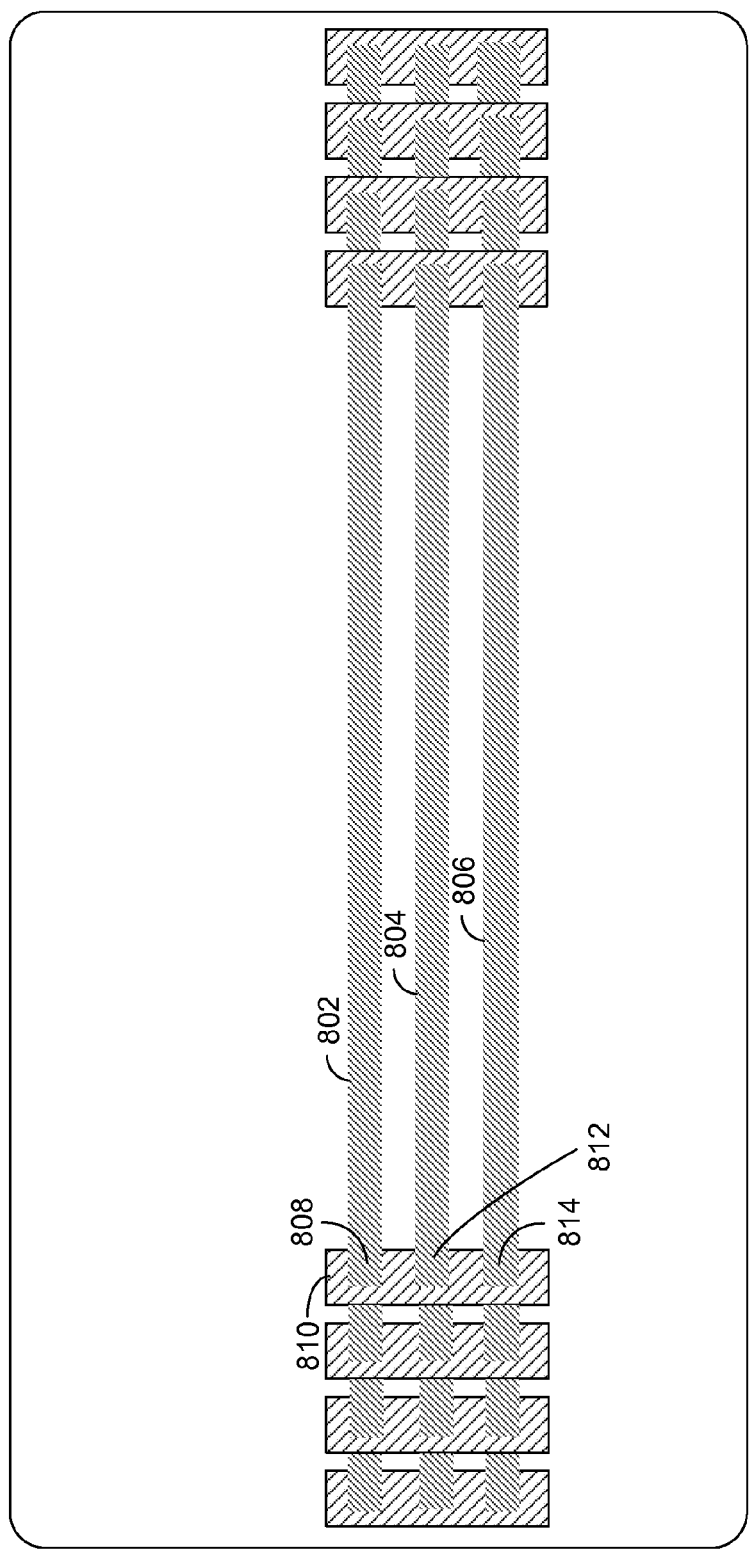
FIG. 8 is an illustration of a card constructed in accordance with the principles of the present invention.

FIG. 8 shows card 800. Card 800 may, for example, include one or more conductive pads 810 and electromagnetic field generators 802-806. One or more conductive pads 810 may exist on a first surface of card 800 and one or more electromagnetic field generators 802-806 may exist on a second surface of card 800.

Persons skilled in the art will appreciate that minimization of conductive area associated with one or more conductive pads 810 within respective one or more regions 808 may be implemented to reduce a magnitude of eddy current generated within one or more conductive pads 810 that may be caused by the magnetic field generated by electromagnetic field generator 802. Persons skilled in the art will further appreciate that minimization of conductive area associated with one or more conductive pads 810 within one or more regions 812 and 814 may be implemented to reduce a magnitude of eddy current generated within one or more conductive pads 810 that may be caused by the magnetic field generated by electromagnetic field generators 804 and 806, respectively.

Persons skilled in the art will further appreciate that one or more conductive pads 810 need not necessarily be implemented with shapes as shown in FIG. 8. Other shapes, as shown in FIG. 9, for example, may instead be implemented with similar (e.g., substantially similar) results.

The shapes of one or more conductive pads may be implemented so as to reduce the amount of magnetic flux that is incident upon the conductive pads, thereby minimizing the magnitude of eddy current that may be induced within the conductive pads. In one example, the area of conductive material that is across from one or more of electromagnetic field generators may be minimized. Accordingly, for example, the voided portions and semi-voided portions of conductive pads 902-948, as shown in FIG. 9, exemplify portions of conductive pads 902-948 that may be substantially devoid of conductive material. As a result, the amount of conductive material that may exist across from one or more of electromagnetic field generators is minimized, thereby reducing the magnitude of eddy current that may be induced within conductive pads 902-948.

Persons skilled in the art will appreciate that the capacitance magnitude associated with conductive pads 902-948 is directly proportional to the total area of conductive material contained within conductive pads 902-948. Accordingly, the area of conductive material that is not across from one or more electromagnetic field generators may be increased to, for example, enhance detection capability.

Persons skilled in the art will appreciate that each of conductive pads 902-916, and/or any shape and size conductive pad, may be implemented to minimize eddy current generation while maximizing the capacitance magnitude associated with conductive pads 902-916 when, for example, a single electromagnetic field generator is utilized. Persons skilled in the art will further appreciate that conductive pads 902-916 may be arranged to facilitate directional detection of a device whose presence, or contact, is to be detected.

Persons skilled in the art will appreciate that each of conductive pads 918-932, and/or any shape and size conductive pad, may be implemented to minimize eddy current generation while maximizing the capacitance magnitude associated with conductive pads 918-932 when, for example, two electromagnetic field generators are utilized. Persons skilled in the art will further appreciate that conductive pads 918-932 may be arranged to facilitate directional detection of a device whose presence, or contact, is to be detected.

Persons skilled in the art will appreciate that each of conductive pads 934-948, and/or any shape and size conductive pad, may be implemented to minimize eddy current generation while maximizing the capacitance magnitude associated with conductive pads 934-948 when, for example, three electromagnetic field generators are utilized. Persons skilled in the art will further appreciate that conductive pads 934-948 may be arranged to facilitate directional detection of a device whose presence, or contact, is to be detected.

The shape of conductive pad 902 may, for example, be substantially square or rectangular and may include, for example, a single voided portion with a substantially square or rectangular shape. Conductive pad 902 may, for example, have substantially sharp corners and sharp edges. The single voided portion of conductive pad 902 may, for example, have substantially sharp corners and sharp edges.

The shape of conductive pads 918 and 934 may, for example, be substantially square or rectangular and may include, for example, two or three voided portions, respectively, with substantially square or rectangular shapes. Conductive pads 918 and 934 may, for example, have substantially sharp corners and sharp edges. The voided portions of conductive pads 918 and 934 may, for example, have substantially sharp corners and sharp edges.

The shape of conductive pad 904 may, for example, be substantially square or rectangular and may include, for example, a single voided portion with a substantially circular or elliptical shape. Conductive pad 904 may, for example, have substantially sharp corners and sharp edges. The single voided portion of conductive pad 904 may, for example, have a substantially rounded edge.

The shape of conductive pads 920 and 936 may, for example, be substantially square or rectangular and may include, for example, two or three voided portions, respectively, with substantially circular or elliptical shapes. Conductive pads 920 and 936 may, for example, have substantially sharp corners and sharp edges. The voided portions of conductive pads 920 and 936 may, for example, have substantially rounded edges.

The shape of conductive pad 906 may, for example, be substantially circular or elliptical and may include, for example, a single voided portion with a substantially square or rectangular shape. Conductive pad 906 may, for example, have substantially rounded edges. The single voided portion of conductive pad 906 may, for example, have substantially sharp corners and sharp edges.

The shape of conductive pads 922 and 938 may, for example, be substantially circular or elliptical and may include, for example, two or three voided portions, respectively, with substantially square or rectangular shapes. Conductive pads 922 and 938 may, for example, have substantially rounded edges. The voided portions of conductive pads 922 and 938 may, for example, have substantially sharp corners and sharp edges.

The shape of conductive pad 908 may, for example, be substantially circular or elliptical and may include, for example, a single voided portion with a substantially circular or elliptical shape. Conductive pad 908 may, for example, have substantially rounded edges. The single voided portion of conductive pad 908 may, for example, have substantially rounded edges.

The shape of conductive pads 924 and 940 may, for example, be substantially circular or elliptical and may include, for example, two or three voided portions, respectively, with substantially circular or elliptical shapes. Conductive pads 924 and 940 may, for example, have substantially rounded edges. The voided portions of conductive pads 924 and 940 may, for example, have substantially rounded edges.

The shape of conductive pad 910 may, for example, be substantially square or rectangular and may include, for example, a single semi-voided portion with a substantially square or rectangular shape having criss-cross conductive strips. Conductive pad 910 may, for example, have substantially sharp corners and sharp edges. The single semi-voided portion of conductive pad 910 may, for example, have substantially sharp corners and sharp edges.

The shape of conductive pads 926 and 942 may, for example, be substantially square or rectangular and may include, for example, two or three semi-voided portions, respectively, with substantially square or rectangular shapes having criss-cross conductive strips. Conductive pads 926 and 942 may, for example, have substantially sharp corners and sharp edges. The semi-voided portions of conductive pads 926 and 942 may, for example, have substantially sharp corners and sharp edges.

The shape of conductive pad 912 may, for example, be substantially square or rectangular and may include, for example, a single semi-voided portion with a substantially square or rectangular shape having a single conductive strip at a substantially non-vertical angle that is angled from right to left. Conductive pad 912 may, for example, have substantially sharp corners and sharp edges. The single semi-voided portion of conductive pad 912 may, for example, have substantially sharp corners and sharp edges.

The shape of conductive pads 928 and 944 may, for example, be substantially square or rectangular and may include, for example, two or three semi-voided portions, respectively, with substantially square or rectangular shapes having single conductive strips at substantially non-vertical angles that are angled from right to left. Conductive pads 928 and 942 may, for example, have substantially sharp corners and sharp edges. The semi-voided portions of conductive pads 928 and 942 may, for example, have substantially sharp corners and sharp edges.

The shape of conductive pad 914 may, for example, be substantially square or rectangular and may include, for example, a single semi-voided portion with a substantially square or rectangular shape having a single conductive strip at a substantially vertical angle. Conductive pad 914 may, for example, have substantially sharp corners and sharp edges. The single semi-voided portion of conductive pad 914 may, for example, have substantially sharp corners and sharp edges.

The shape of conductive pads 930 and 946 may, for example, be substantially square or rectangular and may include, for example, two or three semi-voided portions, respectively, with substantially square or rectangular shapes having single conductive strips at substantially vertical angles. Conductive pads 930 and 946 may, for example, have substantially sharp corners and sharp edges. The semi-voided portions of conductive pads 930 and 946 may, for example, have substantially sharp corners and sharp edges.

The shape of conductive pad 916 may, for example, be substantially square or rectangular and may include, for example, a single semi-voided portion with a substantially square or rectangular shape having a single conductive strip at a substantially non-vertical angle that is angled from left to right. Conductive pad 916 may, for example, have substantially sharp corners and sharp edges. The single semi-voided portion of conductive pad 916 may, for example, have substantially sharp corners and sharp edges.

The shape of conductive pads 932 and 948 may, for example, be substantially square or rectangular and may include, for example, two or three semi-voided portions, respectively, with substantially square or rectangular shapes having single conductive strips at substantially non-vertical angles that are angled from left to right. Conductive pads 932 and 948 may, for example, have substantially sharp corners and sharp edges. The semi-voided portions of conductive pads 932 and 948 may, for example, have substantially sharp corners and sharp edges.

Persons skilled in the art will appreciate that formation of conductive areas and voided areas within conductive pads having sharp corners and sharp edges may be more complex as compared to, for example, conductive areas and voided areas that do not have sharp corners and sharp edges. Accordingly, for example, conductive pads and voided areas that do not have sharp corners and sharp edges may be less expensive and less time consuming to manufacture. Persons skilled in the art will further appreciate that conductive areas within conductive pads are continuous. In particular, for example, voided areas or semi-voided areas within the conductive pads do not break the continuity of each conductive area within the conductive pads.

Figures 10, 11:
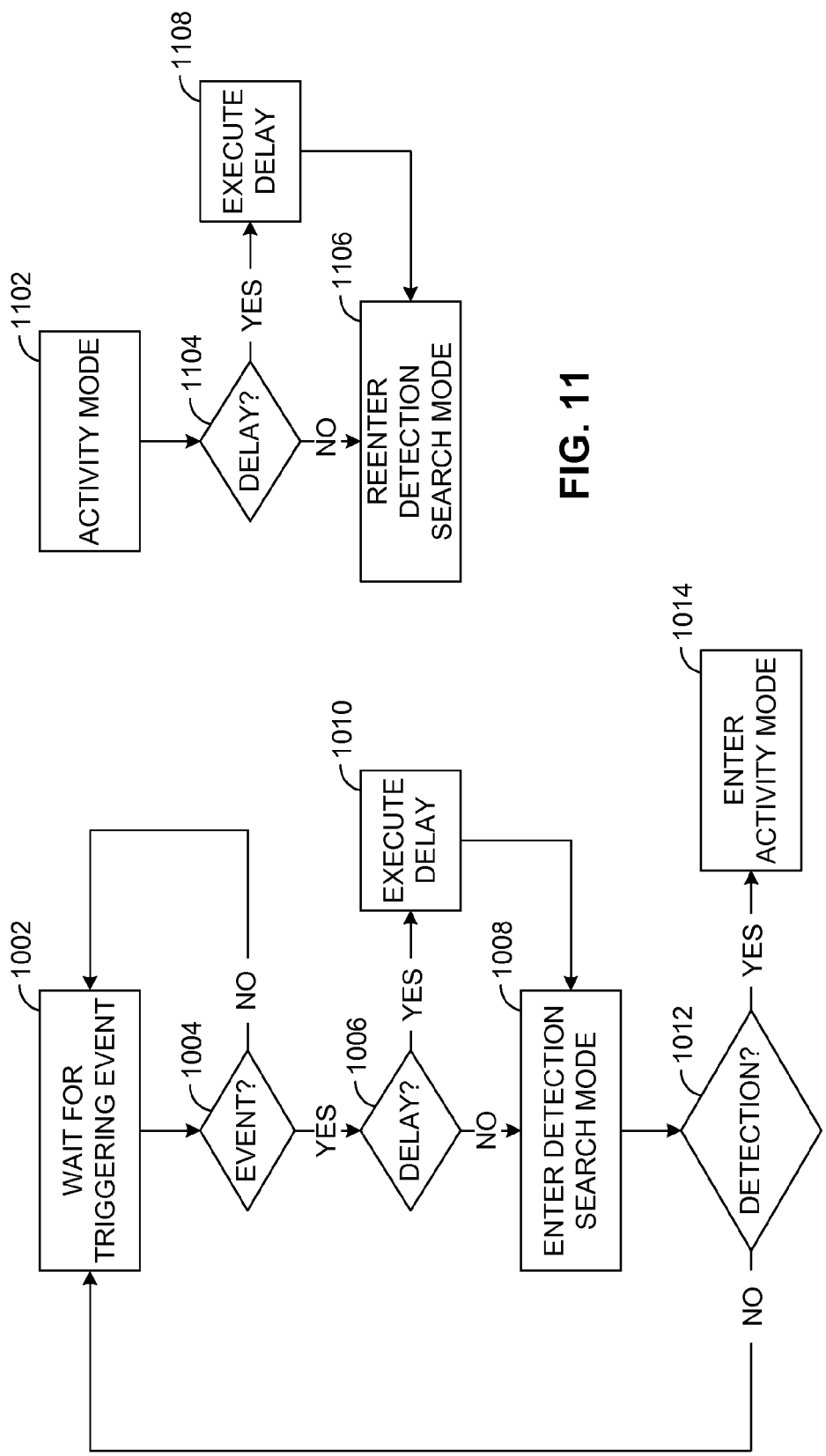
FIG. 10 is an illustration of a process flow chart constructed in accordance with the principles of the present invention.
FIG. 11 is an illustration of a process flow chart constructed in accordance with the principles of the present invention.

Turning to FIG. 10, a flow diagram of a detection/activity operation of a card is shown. In step 1002, a card may exist within an idle state (e.g., a low-power sleep mode) whereby a magnitude of operational power consumed by a card is, for example, reduced or at zero. Triggering event 1004 may transition the card from the idle state into, for example, an active mode, whereby for example, one or more detectors may be used to determine whether a card is in a proximate, or touching, relationship with an object or device.

According to step 1006, a card may linger in idle state 1010 before entering search mode 1008. State 1010 may reduce the amount of time that may be necessary to successfully execute a detection search. Persons skilled in the art will appreciate that the number of charge/discharge sequences that may be executed to perform an active detection search may be reduced by delay 1010 without sacrificing the effectiveness of the detection search. Persons skilled in the art will further appreciate, therefore, that a reduction in the consumption of operational power may be realized.

Once detection has occurred, as in step 1012 for example, a card may then transition into an active mode as in step 1014. The activity mode may be, for example, an information exchange event, whereby information is exchanged between a card and any number of devices that are detected to be operative to communicate with a card via any number of audible, visible, electrical, or electromagnetic means as necessary.

While a card remains in activity mode 1102 of FIG. 11, a card may re-enter a detection search mode, as in step 1106 for example, to verify that a card either remains in a proximate, or touching, relationship with a device, or to verify that a card has reentered into a proximate, or touching, relationship with a device. Similarly as discussed above, delay 1108 may be optionally executed to reduce an amount of time that may be necessary to successfully execute the detection search of step 1106. Persons skilled in the art will appreciate that the number of charge/discharge sequences that may be executed during an active detection search may be reduced by delay 1108 without sacrificing the effectiveness of the detection search. Persons skilled in the art will further appreciate, therefore, that a reduction in the consumption of operational power may be realized.

Figure 12:
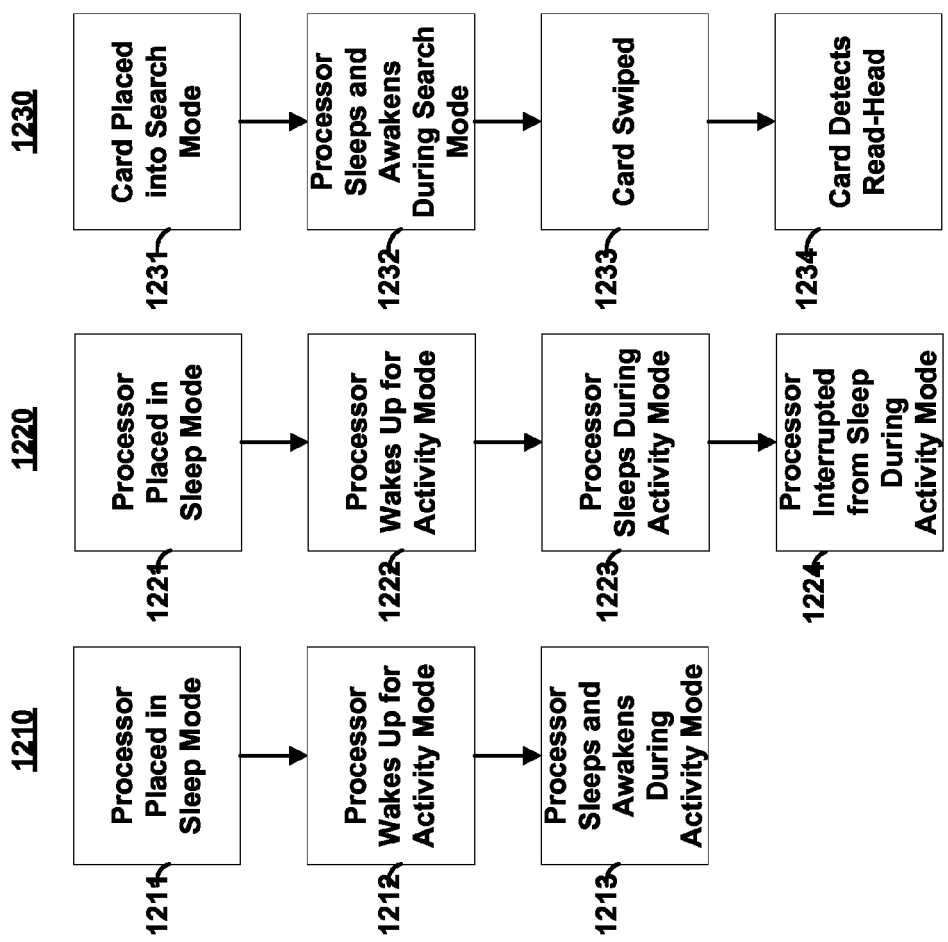
FIG. 12 is an illustration of process flow charts constructed in accordance with the principles of the present invention.

FIG. 12 shows flow charts of sequences 1210-1230. Step 1211 of sequence 1210 may, for example, include placing a processor into a sleep mode, whereby the processor draws little or no power during the sleep mode. In step 1212, a processor may be awakened from a sleep mode to perform an activity during an activity mode. The processor may, for example, be awakened from a sleep mode by an external event (e.g., pressing of a button on a card). In step 1213, a processor may, for example, sleep and awaken multiple times during an activity mode. For example, a processor may sleep and awaken multiple times per second (e.g., at least 20 times per second) during an activity mode. In so doing, for example, the processor may consume less power during the activity mode.

Step 1221 of sequence 1220 may, for example, place a processor into a sleep mode (e.g., a low-power mode of operation). In step 1222, a processor may be awakened from a sleep mode by an external event (e.g., pressing a button on a card). While a processor operates during an activity mode, the processor may be placed back into a sleep mode (e.g., as in step 1223) during an amount of time when the processor is not utilized during the activity mode. In step 1224, a processor may be awakened from a sleep mode by an external event (e.g., a processor interrupt) when the processor is required to, for example, perform operations during the activity mode. The processor may then be placed back into a sleep mode when the necessary operations are completed.

Step 1231 of sequence 1230 may, for example, place a card into a search mode. For example, a card may actively search for the presence of a read-head housing of a magnetic stripe reader during the search mode. A processor of a card may, for example, charge and discharge one or more conductive pads during the search mode to detect, for example, a capacitance change in the one or more conductive pads (e.g., as may be caused by the presence of a read-head housing of a magnetic stripe reader). Accordingly, for example, a search mode may progress for a number of minutes until a read-head housing of a magnetic stripe reader is detected or a timeout occurs.

In step 1232, a processor may, for example, initiate the charging and discharging of the one or more conductive pads during the search mode and then go to sleep while the one or more conductive pads are being charged and/or discharged. The processor may, for example, be awakened during the search mode when the one or more conductive pads achieve a threshold level (e.g., the processor may be interrupted from a sleep mode when the one or more conductive pads achieve a signal magnitude that triggers a processor interrupt).

Once awakened, the processor may, for example, measure a capacitance change in the one or more conductive pads and then re-initiate a charge/discharge sequence of the one or more conductive pads. Accordingly, for example, a processor may cycle between sleep and awake modes multiple times per second. In so doing, a power savings may be achieved while the card is actively searching for the presence of, for example, a read-head housing of a magnetic stripe reader.

In step 1233, a card may be swiped through a magnetic stripe reader that may, for example, cause a capacitance change to occur in one or more conductive pads on the card. Accordingly, for example, a processor of a card may detect the presence of the magnetic stripe reader (e.g., as in step 1234) and may then initiate a communication sequence with the magnetic stripe reader.

Persons skilled in the art will appreciate that a button may be pressed in order to provide electrical energy to read-head detectors such that read-head detectors may detect an object (e.g., a read-head housing). A period of time may be provided in which the electrical energy is delayed from being provided to the read-head detectors after a button is pressed. This delay may be, for example, between approximately one-hundredth of a second and one second (e.g., between approximately one quarter and one half of a second). In doing so, electrical energy provided to a read-head detector may be reduced in the amount of time it takes a user to press a button and swipe a card. During this period of delay, for example, a processor may be put into sleep mode once or multiple times (e.g., at a particular frequency). A read-head detector detecting a read-head may provide information to a processor and the processor may, in turn, cause a communication to occur from a dynamic magnetic stripe communications device. The card may automatically go into a sleep mode after a period of time after a card is detected as being swiped (e.g., approximately between 5 seconds and sixty seconds such as approximately between 10 seconds and thirty seconds). If the card is re-swiped before the card goes into sleep mode for not being swiped, this period of time may be reset such that a card may be re-swiped continually so long as the card is re-swiped in this period of time. At the beginning of each re-swipe period, a period of delay may occur before electrical energy is introduced to the read-head detectors in order to reduce power. This period of delay may be, for example, between approximately one hundredth of a second and one second (e.g., between approximately one quarter and one third of a second). The period of delay to provide electrical energy to a read-head detector for a re-swipe period may be, for example, less than the period of delay to provide electrical energy to a read-head detector after a button is pressed. Persons skilled in the art will appreciate that providing electrical energy to a read-head detector may be, for example, a processor utilizing a read-head detector to start attempts at detecting an object such as a read-head detector housing.

Persons skilled in the art will also appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A device, comprising:
   a conductive pad including a plurality of separated conductive areas electrically connected by one or more conductive strips, wherein the conductive pad is not part of a magnetic emulator.

2. The device of claim 1, wherein the conductive pad is at least part of a read-head detector.

3. The device of claim 2, wherein the plurality of separated conductive areas is at least four separated conductive areas.

4. The device of claim 2, further comprising a battery.

5. The device of claim 1, further comprising:
   one or more communications devices,
   wherein a number of the one or more conductive strips corresponds to a number of the one or more communications devices.

6. The device of claim 1, further comprising:
   one or more communications devices;
   wherein the one or more conductive strips is a plurality of conductive strips, and
   every two of the plurality conductive strips correspond to a different communications device.

7. The device of claim 1, further comprising:
   a communications device;
   wherein the one or more conductive strips is a single conductive strip, and
   a centerline of the communications device is closer to a center portion of the single conductive strip then to center portions of any of the plurality of separated conductive areas.

8. The device of claim 1, further comprising:
   a plurality of electromagnetic field generators;
   wherein the one or more conductive strips is a plurality of conductive strips, and
   each of the plurality conductive strips corresponds to a different electromagnetic field generator.

9. The device of claim 1, further comprising:
   a plurality of electromagnetic field generators;
   wherein the one or more conductive strips is at least four conductive strips, and
   every two of the least four conductive strips corresponds to a different one of the plurality of electromagnetic field generators.

10. The device of claim 1, further comprising:
    a plurality of electromagnetic field generator including a first electromagnetic field generator and a second electromagnetic field generator;
    wherein the plurality of separated conductive areas is at least three separated areas, the at least three separated areas including a first area, a second area and a third area, the second area between the first area and the third area,
    the one or more conductive strips is a plurality of conductive strips, the plurality of conductive strips including a first strip and a second strip,
    the first area is connected to the second area by the first strip,
    the third area is connected to the second area by the second strip, the first electromagnetic field generator is at least partially over the first strip, and the second electromagnetic field generator is at least partially over the second strip.

11. The device of claim 1, further comprising:
a dynamic magnetic stripe communications device;
wherein the conductive pad is at least part of a read-head detector.

12. The device of claim 1, further comprising:
at least one communications device; and
a processor.

13. The device of claim 1, further comprising:
at least one communications device;
a bi-stable display; and
a processor.

14. The device of claim 1, further comprising:
at least one communications device;
a button; and
a processor.

15. The device of claim 1, further comprising:
a memory,
driving circuitry; and
a display.

16. The device of claim 1, wherein the conductive pad is at least part of a non-invasive detector.

17. The device of claim 1, wherein the conductive pad is one of substantially square or substantially rectangular,
the one or more conductive strips is a plurality of criss-crossing conductive strips, and
edges and corners of the conductive pad are substantially sharp.

18. The device of claim 1, wherein edges and corners of the conductive pads are not sharp.

19. A device, comprising:
a conductive pad including a plurality of separated conductive areas electrically connected by a plurality of conductive strips; and
one or more communications devices, every two of the plurality of conductive strips correspond to a different communications device.

20. The device of claim 19, further comprising:
a dynamic magnetic stripe communications device,
wherein the conductive pad is at least part of a read-head detector.

21. The device of claim 19, wherein the plurality of separated conductive areas is at least four separated conductive areas.

22. The device of claim 19, further comprising:
a processor.

23. The device of claim 19, further comprising:
a bi-stable display; and
a processor.

24. The device of claim 19, further comprising:
a button; and
a processor.

25. The device of claim 19, further comprising:
a memory;
driving circuitry; and
a display.

26. The device of claim 19, wherein the conductive pad is at least part of a non-invasive detector.

27. The device of claim 19, wherein edges and corners of the conductive pads are not sharp.

28. The device of claim 19, further comprising a battery.

29. A device, comprising:
a conductive pad including a plurality of separated conductive areas electrically connected by a single conductive strips; and
a communications device,
a centerline of the communications device is closer to a center portion of the single conductive strip then to center portions of any of the plurality of separated conductive areas.

30. A device, comprising:
a conductive pad including a plurality of separated conductive areas electrically connected by a plurality of conductive strips; and
a plurality of electromagnetic field generators,
each of the plurality of conductive strips corresponds to a different electromagnetic field generator.

31. A device, comprising:
a conductive pad including a plurality of separated conductive areas electrically connected by one or more conductive strips; and
a plurality of electromagnetic field generators,
wherein the one or more conductive strips is at least four conductive strips, and
every two of the least four conductive strips corresponds to a different one of the plurality of electromagnetic field generators.

32. A device, comprising:
a conductive pad including a plurality of separated conductive areas electrically connected by one or more conductive strips; and
a plurality of electromagnetic field generators including a first electromagnetic field generator and a second electromagnetic field generator,
wherein the plurality of separated conductive areas is at least three separated areas, the at least three separated areas including a first area, a second area and a third area, the second area between the first area and the third area,
the one or more conductive strips is a plurality of conductive strips, the plurality of conductive strips including a first strip and a second strip,
the first area is connected to the second area by the first strip,
the third area is connected to the second area by the second strip,
the first electromagnetic field generator is at least partially over the first strip, and
the second electromagnetic field generator is at least partially over the second strip.

33. A device, comprising:
a conductive pad including a plurality of separated conductive areas electrically connected by a plurality of criss-crossing conductive strips,
wherein the conductive pad is one of substantially square or substantially rectangular,
and
edges and corners of the conductive pad are substantially sharp.

* * * * *